(12) United States Patent
Antipenko et al.

(10) Patent No.: US 8,475,725 B1
(45) Date of Patent: Jul. 2, 2013

(54) SYSTEM AND METHOD FOR LIQUID TREATMENT

(75) Inventors: Alexander Antipenko, Brooklyn, NY (US); Dmitry Budovich, Moscow (RU); Richard H. Sakaji, El Cerrito, CA (US); Alexander Medvedev, Moscow (RU); Eugene Veklerov, Albany, CA (US); Vladimir Rakhamimov, Albany, CA (US)

(73) Assignee: East Coast Distribution, Inc., Brooklyn, NY (US)

( * ) Notice: Subject to any disclaimer, the term of this patent is extended or adjusted under 35 U.S.C. 154(b) by 0 days.

(21) Appl. No.: 13/591,191

(22) Filed: Aug. 21, 2012

(51) Int. Cl.
*G01N 21/00* (2006.01)
*C02F 9/12* (2006.01)
*B01D 61/58* (2006.01)

(52) U.S. Cl.
USPC ............ 422/186.3; 210/748.01; 210/748.1; 210/748.11; 210/748.12; 210/748.13; 422/22; 422/24; 422/186; 250/432 R; 250/436

(58) Field of Classification Search
USPC ............ 210/748.01, 748.1, 748.11, 178.12, 210/748.15, 748.16, 748.17, 749, 758, 153, 210/243, 294, 295, 296, 192, 205, 760; 250/24, 250/325, 326, 428, 432 R, 436, 493.1, 494.1, 250/504 R; 422/22, 24, 27, 28, 29, 186, 186.03, 422/186.04, 186.07, 186.21, 186.3, 187; 204/155, 156, 157.15, 157.44, 164, 450, 204/193, 194, 413
See application file for complete search history.

(56) References Cited

U.S. PATENT DOCUMENTS

| | | | | |
|---|---|---|---|---|
| 5,194,740 | A * | 3/1993 | Kogelschatz et al. | 250/492.1 |
| 5,834,784 | A * | 11/1998 | Morgan et al. | 250/436 |
| 6,201,355 | B1 * | 3/2001 | Morgan et al. | 315/248 |
| 6,633,109 | B2 * | 10/2003 | Falkenstein | 313/29 |
| 7,342,227 | B1 * | 3/2008 | Blair et al. | 250/324 |
| 2008/0142452 | A1 * | 6/2008 | Denkewicz et al. | 210/748 |
| 2009/0101835 | A1 * | 4/2009 | Fraser et al. | 250/436 |
| 2011/0076196 | A1 * | 3/2011 | Chittka et al. | 422/68.1 |

* cited by examiner

*Primary Examiner* — Khanh Nguyen
*Assistant Examiner* — Cameron J Allen
(74) *Attorney, Agent, or Firm* — Nadya Reingand (57) ABSTRACT

A method and energy-efficient apparatus for the treatment of liquids through the joint use of a gas mixture-oxidizing agent and UV radiation. This method uses an excimer UV lamp performing two actions affecting the liquid and changing its properties with UV radiation and the generation of a gas mixture containing strong oxidizing agents for influence on the liquid, disinfection and purification of the liquid being treated from contaminants. The apparatus incorporates energy efficient design features to reduce energy consumption and operational costs, as well as an excimer lamp design that improves performance parameters to surpass and outlast existing devices. Unique electrode designs, cleaning systems, and materials combine to create a state-of-the-art liquid treatment apparatus that exceeds existing industrial analogs and norms.

24 Claims, 8 Drawing Sheets

SYSTEM AND METHOD FOR LIQUID TREATMENT

TECHNICAL FIELD

The invention relates to the methods and apparatus for changing the properties of liquids and/or disinfecting and/or purification of the liquids or the mixtures of liquids (drinking water and wastewater, liquids used in technological, pharmaceutical, medical and other applications) that are amenable to oxidation. The change of liquid properties (changing the redox potential of the liquid), removal of biological and chemical contaminants, dissolved metals and salts, oxidation or decomposition of organic compounds, and disinfection due to application of the ultraviolet radiation and oxidizing agents.

BACKGROUND OF THE INVENTION

UV radiation with mercury UV lamps is widely used for disinfecting and oxidation of contaminants in the liquids. However, mercury UV lamps have a long warm-up period (at least a few minutes), which increases the startup time of operation, and the lamps cannot be operated in a pulsed mode. Mercury UV lamps cannot be turned on immediately after the shutdown, making it difficult to continue their operation after an unscheduled shutdown. There are major problems with their disposal; they are not environmentally friendly, it is necessary to control the mercury vapor level, the lamps must be transported in special containers, and mercury cleaning in the event of damaged lamps is an additional expense. In addition, during irradiation of pathogens by a mercury UV lamp, a content of remaining living organisms is relatively high due to their photo-reactivation, i.e. there is incomplete breakdown of the structure of DNA of the microorganisms from a single exposure of the spectral emission line of mercury.

UV lamps have been used to generate ozone. The creation of ozone requires the use of a lamp, which is designed to allow 185 nm to transmit through the lamp sleeve. Air (usually ambient) is passed over an UV lamp, which splits oxygen molecules ($O_2$) in the gas. The resulting oxygen atoms ($O^-$), seeking stability, attach to other oxygen molecules, forming ozone ($O_3$). The ozone is injected into contaminated liquid or air stream, where it inactivates contaminants. However, the maximum ozone production rate is very low; namely, maximum concentration of ozone that can be produced by 185-nm UV lamp is 0.2 percent by weight, approximately 10% of the average concentration available by corona-discharge. Considerable more electrical energy is required to produce a given quantity of ozone by UV radiation than by corona-discharge. Lower gas phase concentrations of ozone generated by UV radiation translate into the handling of much higher gas volumes than with corona-discharge generated ozone.

The technologies involved in corona-discharge ozone generators are varied, but all operate fundamentally by passing oxygen-containing gas through an electrical field. The electrical current causes the "split" on the oxygen molecules as described above on UV ozone generation. For production of ozone, corona-discharge is used more because of the greater advantages of this method. Advantages are the relatively lower costs for ozone production (more cost-effective compering with UV ozone generation) and the greater durability of the system. However, the existing barrier discharge ozone generators are expensive; they require a large area for their installation, and they require a powerful high voltage source. Corona-discharges result in a fast deterioration of the dielectric barrier. Also, corona-discharges erode working electrodes. The ozone generators need frequent maintenance by highly qualified personnel (for example, for replacement of dielectric barriers). The ozone generators consume a large amount of electrical power. The energy efficiency of implemented electro-synthesis processes is very low (1-2%). These generators need water cooling, and as a consequence, they require a source of water. This requirement makes them less sustainable. Excessive heat also plays a part in possible excessive nitrogen oxide production—especially in humid environments.

Irradiation of the liquids with an excimer lamp, more specially a dielectric barrier discharge excimer lamp filled with xenon or argon is one of effective techniques to disinfect the liquids and remove contaminants. However, the existing excimer lamps are inefficient due to their design limitations; the inventors or manufacturers of the lamps do not provide any criteria for the selection of the diameters, shape, and lengths of the emitting sleeves of the lamps; for changing the conductivity of the emitting sleeves; for choosing end sides of the lamp; and for choosing an electrode, its type, material, coating, etc. The existing excimer lamps do not use the liquid being treated as one or more electrodes. The exciting excimer lamps require a high ignition voltage. Also, the existing excimer lamps have a high cost, and there is a high level of production of defective lamps. The degree of disinfection or purification of contaminated liquids with the existing treatment systems with excimer lamps is inadequate if the liquid's transmittance of UV is low. The existing treatment systems with excimer lamps have an inadequate flow rate of the treatment in a scheme for one lamp in a reactor.

The existing methods of concurrent exposure of a liquid to UV radiation and oxidants provide better disinfection and purification of contaminated liquids; however, the existing methods are designed and implemented as two independent unit processes. Hence, they result in a high failure rate, large power consumption, and high operating costs.

SUMMARY OF THE INVENTION

In order to solve the problems of the prior art as described above, it is an object of the present invention to provide a method and apparatus (a reactor) for changing properties, disinfection and/or purification of a liquid or a mixture of liquids being treated, whereby the technological and economic effect of the liquid treatment is achieved by the concurrent exposure of the liquid to the optimal balance of a dose of irradiation by UV light and concentration of generated oxidizing agents while maintaining a low energy consumption.

The present invention provides the maximum efficiency of disinfection and/or purification of the liquids being treated (optimal balance of UV radiation, oxidants generation, and energy consumption), a low cost per cubic meter of treated liquid, no requirement for additional materials (chemical reagents, etc), low energy consumption and operating costs, ecological soundness, no need of waste and chemical residual disposal, a high level of economic efficiency in practical applications.

To accomplish the above objects, the present invention provides the integrated measures listed below.

LEGEND FOR PATENT APPLICATION DRAWINGS

1—Excimer lamp
2—Outer sleeve of the lamp
2a—Coating on outer sleeve of the lamp
2b—Solder area
3—Inner sleeve of the lamp
3a—Coating on inner sleeve of the lamp
4—Space between the outer sleeve and the inner wall of the reactor
5—Space inside the inner sleeve
6—Space between the outer sleeve and the inner sleeve
7—Flanges for fastening the lamp in the reactor
8—Reactor housing
9—Ends of the lamp
9a—Joints
9b—Transition rings
9c—Coating on the ends of the lamp
9d—Solder area
9e—Joint in the solder area
10—Separator installed in the space between the outer sleeve and the inner wall of the reactor
11—Separator installed in the space inside the inner sleeve
12—Wiper in the space between the outer sleeve and the inner wall of the reactor
13—Screw drive in the space between the outer sleeve and the inner wall of the reactor
14—Example of the electrode (spiral configuration) installed in the space inside the inner sleeve
15—Wiper in the space inside of the inner sleeve
16—Screw drive in the space inside of the inner sleeve
17—Example of the electrode (spiral configuration) installed in the space outside of the outer sleeve
18—Wiper with holes in the space between the outer sleeve and the inner wall of the reactor
19—Air filter
20—Influent Gas line
21—Reactor
22—Chamber for mixing of liquid being treated with oxidizing agents
23—Filter for liquid treatment
24—Additional treatment of liquid
25—Dosing injector
26—Line for gas mix containing oxidants
27—Influent Liquid line
28—Gas line with oxidizing agents
29—Degasifier
30—Oxygen supply source
31—Ultrasonic generator
32—Air drier
33—Air humidity meter
34—Line from air humidity meter to alarm device
35—High Frequency Power source
36—Control feedback loop that looks at loss of oxidants and increases power to generate more oxidants
37—Gas analyzer that measures the concentration of oxidizing agents
38—Alarm device
39—Temperature Sensor
40—Analytical unit
41 through 47—Valves
48 Tank for cleaning liquid
49—Tee fitting
50—Filter for purification of waste cleaning liquid

DETAILED DESCRIPTION OF THE PREFERRED EMBODIMENT

Excimer Lamp

The source of UV radiation in accordance with this invention is excimer lamp 1 consisting of two coaxial sleeves 2 and 3. The sleeves are made of a material transparent to radiation in ultraviolet light and vacuum ultraviolet light ranges of spectrum (hereinafter referred to simply as the UV light), such as synthetic quartz, possibly with a stabilizer additive. The stabilizer additive in the sleeves material is novel; it allows widening the spectral bandwidth of the UV radiation of the sleeve material.

The two inactive ends 9 of the lamp 1 may be made of a material with the same coefficient of linear thermal expansion (CLTE) as that of the active synthetic quartz inner 3 and outer 2 sleeves. The material of the ends 9 may have UV transmission characteristics different from those of the sleeves 2 and 3, or it may block radiation in UV range of spectrum altogether (or does not have capability for UV transmission at all). The use of different materials for the manufacturing of active sleeves 2 and 3 and inactive ends 9 of the lamp 1 is innovative, it provides cost savings and simplification the manufacturing procedure; making the production and assembly of the excimer lamp more straightforward, reliable and streamlined.

The material of the two inactive ends 9 of the lamp 1 may have a CLTE that is different from the CLTE of synthetic quartz used for the active inner 3 and outer 2 sleeves. For the purpose of compatibility, transition rings 9b (parts of a material, matching the CLTE of the material of the active sleeves with the CLTE of the material of the ends of the lamp, in the required amount) of an appropriate size and made of a material with an appropriate CLTE are used. Transition rings 9b are unique to this invention. Their advantages are a reduction of the production cost and the ability to automate the lamps manufacturing process and, consequently, significantly reduce the cost of the excimer lamp.

The edges where the inner 3 and outer 2 active (emitting) sleeves join the ends 9 of the lamp 1 may have joints 9a with a transitional CLTE. The use of joints 9a is novel in the art; the advantage of this solution is the lack of a significant effect on the intensity of the excimer lamp emission due to the location, length, and geometric dimensions of the joints.

Solder areas 9d (the areas, which is used for connecting to a vacuum machine or a gas supply source, for technological testing of a lamp and filling the lamp with an excimer gas) may be located on inactive ends 9 of the lamp 1 and may have a CLTE different from that of the CLTE of active sleeves 2 and 3 of the lamp 1. The use of a CLTE of the solder areas that is different from the CLTE of the active surfaces of the lamp is unique to this invention. The advantages of this solution are an improved automation of the lamp's production, reducing defects in the manufacturing of the excimer lamps and a more effective quality control.

Solder areas 2b (the areas used for connecting to a vacuum machine or a gas supply source, for technological testing of a lamp and filling the lamp with an excimer gas) may be located on one of active sleeves 2 or 3 of lamp 1 and made of the same material as sleeves 2 and 3. Alternatively, the solder areas may have a joint or joints 9e made of different or identical materials, in which case they will be either processed appropriately, or include certain additives or coatings making the materials of the joint and the sleeves 2 and 3 consistent during the operation. The advantages of joints are an improved automation of the lamp's production and reducing defects in the manufacturing of the lamps.

Outer 2 and inner 3 sleeves may have a coating, respectively, 2a and 3a that changes the electrical conductivity compared to the main material that sleeves 2 and 3 are made of. This may reduce the excimer emission by between 0.1% and 83.4%. The use of coating of sleeve 2 and sleeve 3 that changes the electrical conductivity of the sleeves surface is unique to this invention.

Two inactive ends 9 of lamp 1 may have a coating 9c that reduces their electrical conductivity compared to the main material ends 9 are made of. The advantage of using the coating 9c is the increased operating voltage of the excimer lamp 1 without the possibility of an electrical breakdown.

Excimer lamp 1 (the annular clearance space 6 between outer sleeve 2 and inner sleeve 3) may be filled with a noble gas (Ar, Ne, Xe or another gas) and additives that improve its operational characteristics, such as the maximum intensity of the spectral output, the nature of the continuous spectrum of radiation in the shortwave area, the spectral characteristics of other areas of spectrum, the ignition voltage, life time; reduce the probability of formations of color centers (defect areas in synthetic quartz where a crystal lattice changes due to the influence of some factors, such as the UV radiation) as well as other factors leading to the performance degradation of the transmission characteristics of the active surfaces of the sleeves 2 and 3 during the lamp operation. The additives that reduce the probability of formations of color centers provide the extended life span of lamp 1, since the formation of color centers leads to a reduction of the transmission coefficient of the excimer lamp 1 material due to changes in the structure (crystal lattice) of the material.

The pressure of the gas filling space 6 of lamp 1 is optimized in accordance with the material of the active sleeves 2 and 3 and lies within a range allowing the use of a source with a voltage not exceeding 50 kv with the possibility of increasing of the initial ignition voltage required to start the operation (one-stage impact at the beginning of a cycle) by no less than 10%.

In the production of lamp 1, the material of all surfaces or parts thereof may be treated chemically, thermally, or otherwise in order to improve the operational characteristics of lamp 1 (increasing the life time, improving spectral transmission characteristics, mechanical stability, tolerance to the sign-variable mechanical force loads, the fluctuation of pressure of the operation, changes in temperature, chemical composition of the liquid being treated, and the external radiation of any wavelength).

During the filling phase of lamp 1 manufacturing, the method of desorption of the dissolved additives is used. The method involves the removal of water, dissolved gases, and other pollutants from the active surfaces of the sleeves 2 and 3 of lamp 1 by means of filling space 6 of lamp 1 with a special temporary liquid or/and gas mixture causing a short-term increased desorption from the internal surfaces of sleeves 2 and 3 during exposure of desorption mixture to a radiation in the range of the spectrum that is sensitive for the desorption mixture. This method is unique to this invention. The benefits of this method are as follows. It assures the purity of the gas mixture that fills lamp 1; it increases lamp 1 life span; it increases the intensity of the excimer emission; increases of an output of the stable spectral line of radiation of excimer lamp 1, and stability of efficiency of lamp 1 operation in time.

The manufacturing of lamp 1 may employ elements of active gas absorption of the dissolved (under-absorbed) gases and other pollutants and gases generated inside lamp 1 when lamp 1 is connected to a vacuum system or a device for filling it with active, auxiliary or temporary gases based on barium, titanium, zirconium, or other materials (additives in the gas mixture). The benefits of this approach are that it increases lamp 1 life span and the total excimer emission yield.

During the manufacturing of lamp 1, several methods may be used to connect lamp 1 to the gas pump-in and pump-out system. This may be accomplished with a mechanical fastening with screws and bolts, a connection with a flexible (deformable) element, an intermediate material with the same CLTE as that of the tube connected to a vacuum machine or the gas supply source, or with a CLTE differing from it by no more than 30 units of CLTE ($K^{-1}$), a vacuum-tight pressed connection, an adhesive bonding, a connection with tension produced at higher and/or lower temperatures, having a vacuum density at a temperature of the technological run or above or below thereof. The use of connections with flexible (deformable) elements, vacuum-tight pressed connections, adhesive bonding and connections with tension provides the possibility to automate the manufacturing process and reduce lamp 1 production cost.

The wall thickness of active sleeves 2 and 3 is within the range of 0.5 mm to 4 mm, depending on lamp 1 length. The criterion for choosing the sleeve wall thickness is to provide its sufficient mechanical strength while providing the maximum transmission of the excimer emission. The advantage of this criterion is as follows. If the sleeves 2 and 3 wall thickness is <0.5 mm, there will be sharp decline in mechanical strength of the sleeves; if it is >4 mm, there will be sharp decline of the sleeves UV transmissivity. These reasons justify the chosen range.

The length of sleeve 2 and 3 is within the range of 100 mm to 1500 mm. The criterion for choosing lamp 1 length is the balance UV output and generation of the oxidizing agents (ozone, singlet oxygen, hydroxyl radical, and others) and to minimize power consumption. The advantage of this criterion (the minimal power consumption) is as follows. If lamp 1 length is <100 mm, there will be high cost of treatment of the liquid; if lamp 1 length is >1500 mm, there will be sharp decline in mechanical resistance of the lamp. These reasons justify the chosen range.

The diameter of outer sleeve 2 can be in the range from 20 mm to 400 mm. The criterion for choosing the diameter of outer sleeve 2 is the sufficient excimer emission and/or the amount of generated oxidizing agents (ozone, singlet oxygen, hydroxyl radical, and others) with the minimal power consumption. The advantage of this criterion is as follows. If outer sleeve 2 diameter is <20 mm, there will be an insufficient amount of generated UV radiation or oxidants due to an inadequate surface area; if the diameter is >400 mm, there will be a low mechanical resistance of sleeve 2 or small amount of excimer radiation produced due to the need to increase the thickness of the sleeve walls. These reasons justify the chosen range.

The diameter of inner sleeve 3 may be between 3 mm and 396 mm. The criterion for choosing the diameter of inner sleeve 3 is based on the sufficient flow rate of the medium being radiated and flowing through the channel of the inner sleeve 3. The distance between the inner surface of outer sleeve 2 and the outer surface of inner sleeve 3 should provide the minimum operating voltage for the given lamp 1 length. The volume of gas inside lamp 1 should be sufficient for the operation during its lifetime. 3. If the diameter of inner sleeve 3 is <3 mm, there will be sharp reduction of the flow rate of the liquid or a gas mixture being radiated and flowing through the channel of inner sleeve 3; if the diameter is >396 mm, there will be a sharp reduction of the mechanical resistance of sleeve 3.

Inner sleeve 3 may have parts with a different diameter or conic sections located anywhere within inner sleeve 3 and having any length to facilitate the initialization of internal discharge in lamp 1 at the start of its operation. Inner sleeve 3 with parts having a different diameter or conic sections is unique to this invention. Advantages: they provide reduction of ignition voltage, lower power consumption, and reduce the chance of excimer lamp 1 failure at initialization of excimer discharge.

Space 6 of lamp 1 is filled with a mixture of a buffer gas (Ar, Ne, Xe, or other gases) and an easily-ionized additive (Hg, Cd, Zn, Rb, Cu, Ti, or other elements). In this case, the buffer gas can either be a single gas or a mixture of several buffer gases in a certain proportion to optimize UV emissions. Adding both an easily-ionized and/or UV emitting additives is optional. An advantage of filling of lamp 1 with the mixture of several buffer gases: the change of spectrum of excimer radiation that can allow increasing the depth of purification of the liquid being treated.

While lamp 1 is filled up, extra additives, such as bromine, iodine, etc., may be added to the mixture of a buffer gas and an easily-ionized additive, if any. These extra additives provide the atomic lines of their elements in the emission spectrum. Filling of lamp 1 with the mixture of three components has the following advantages: It provides improved performance characteristics of excimer lamp 1, namely, the change in the spectrum of excimer emission with a minimum voltage of ignition. The additives can be pre-selected and added to the mixture for removal of certain types of pathogens or contaminants sensitive to the emission spectrum of these additives.

The criterion for choosing the proportion of the buffer gas and the other components of the gas filling lamp 1 is the maximization of the intensity for the specified lifetime of the lamp.

Space 6 of lamp 1 is filled with a gas and additives at a pressure in the range from 50 to 400 mm Hg (from 66.7 to 533.3 mbar). The range of the pressure is selected based on the criterion of achieving the maximum emission intensity of excimer lamp 1 operating in continuous mode. It depends on the geometrical dimensions of outer 2 and inner 3 active sleeves and on the mixture filling lamp 1. If the filling pressure is either <50 mm or >400 mm, lamp 1 does not form a stable excimer emission.

Electrode System of the Excimer Lamp

The electrode system of excimer lamp 1 consists at least of two electrodes. The liquid acts at least as one of the electrodes, as it has a physical contact with one of the electrical outputs of the power supply 35 of reactor 21. The second electrode is a one- or two- or three-dimensional surface, made of a conducting material with or without applied coating that may change the surface properties of the electrode (conductivity, oxidation resistance, etc.). This electrode has a physical contact with the surface of one of active sleeves 2 or 3 at the entire area of electrode surface and with one of the electrical outputs of power supply 35 of reactor 21. The use of an electrode as a three-dimensional surface, which has a physical contact with the surface of one of active sleeves 2 or 3 has the following advantages: It reduces the ignition voltage of the excimer lamp and, consequently, both saves energy and reduces demand in materials required for the manufacture of a source of high-power excitation of the excimer lamp, and increase the density of the corona-discharge spark generated between adjacent elements of the electrode.

Figure 1:
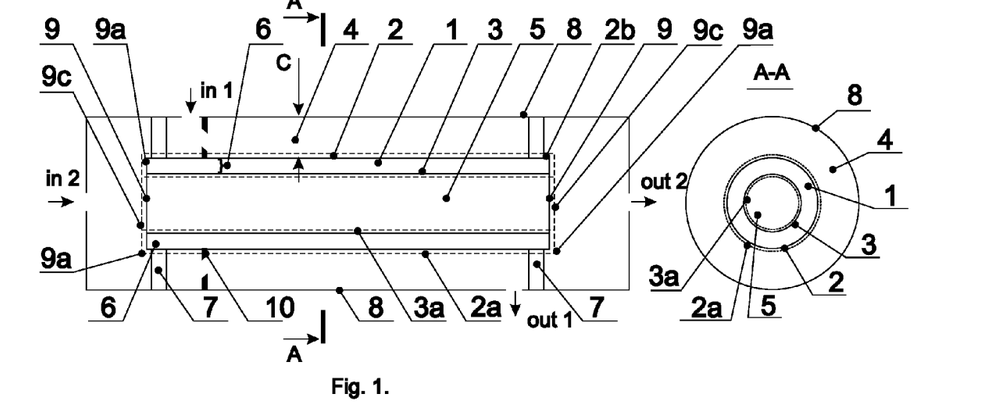
FIG. 1 shows a schematic view of the first embodiment of a reactor with an excimer lamp and a cross section of the reactor according to the present invention.
Figure 2:
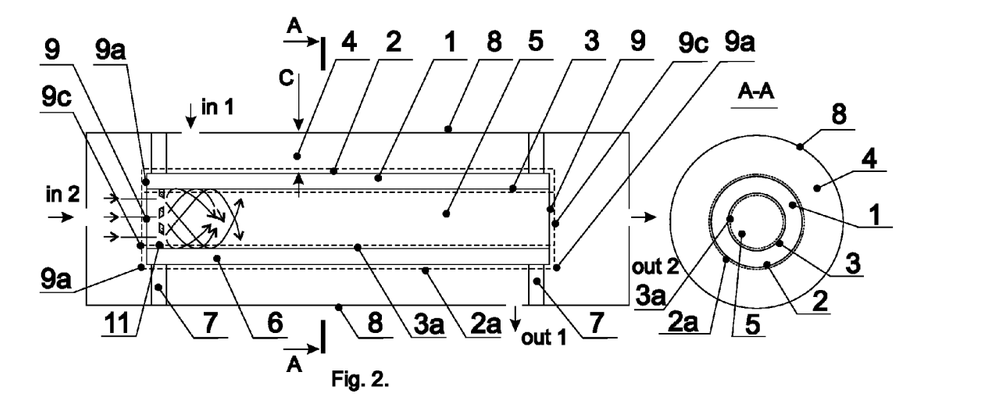
FIG. 2 shows a schematic view of the second embodiment of a reactor with an excimer lamp and a cross section of the reactor according to the present invention.
Figure 4:
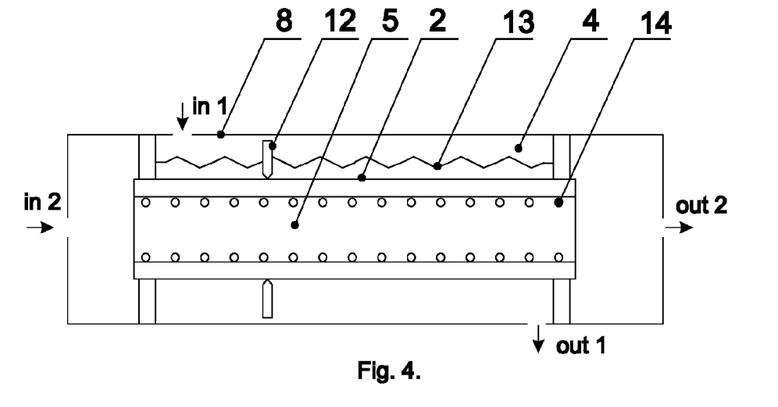
FIG. 4 shows a schematic view the first embodiment of a reactor with a sleeve wiping system and an example of an electrode that is not the liquid being treated.
Figure 5:
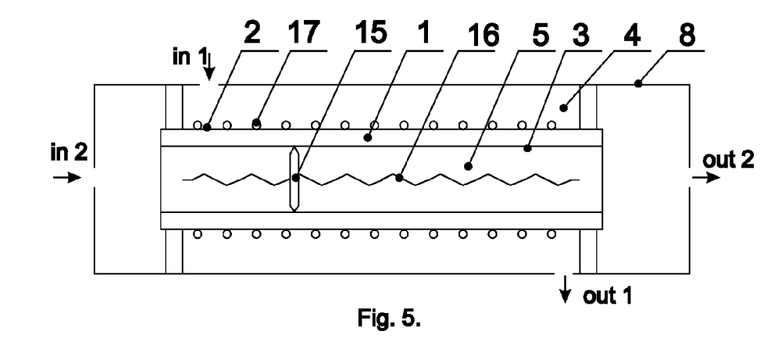
FIG. 5 shows a schematic view the second embodiment of a reactor with a sleeve wiping system and an example of an electrode that is not the liquid being treated.

The electrode, which is represented by a liquid, may be in contact with either outer active sleeve 2 (The first embodiment 1, FIG. 1, FIG. 3, FIG. 4 and FIG. 6) or inner active sleeve 3 (the second embodiment, FIG. 2 and FIG. 5). In the first embodiment, the radiation generated by outer sleeve 2 is used to change the properties of the liquid being treated; in the second embodiment, the radiation generated by inner sleeve 3 is used to change the properties of the liquid being treated.

The additives may be added to the electrode represented by a liquid being treated for changing its chemical and physical characteristics. It may be used for a short-term treatment of the surfaces of outer 2 and/or inner 3 active sleeves from contamination. The utilization of additives to the liquid electrode is unique to this invention. Advantages: the combined effect of a potential of the high-voltage electrode and chemical additives added to the liquid provides higher transparency of the liquid and ensures the high reliability of the liquid treatment.

Figure 21:
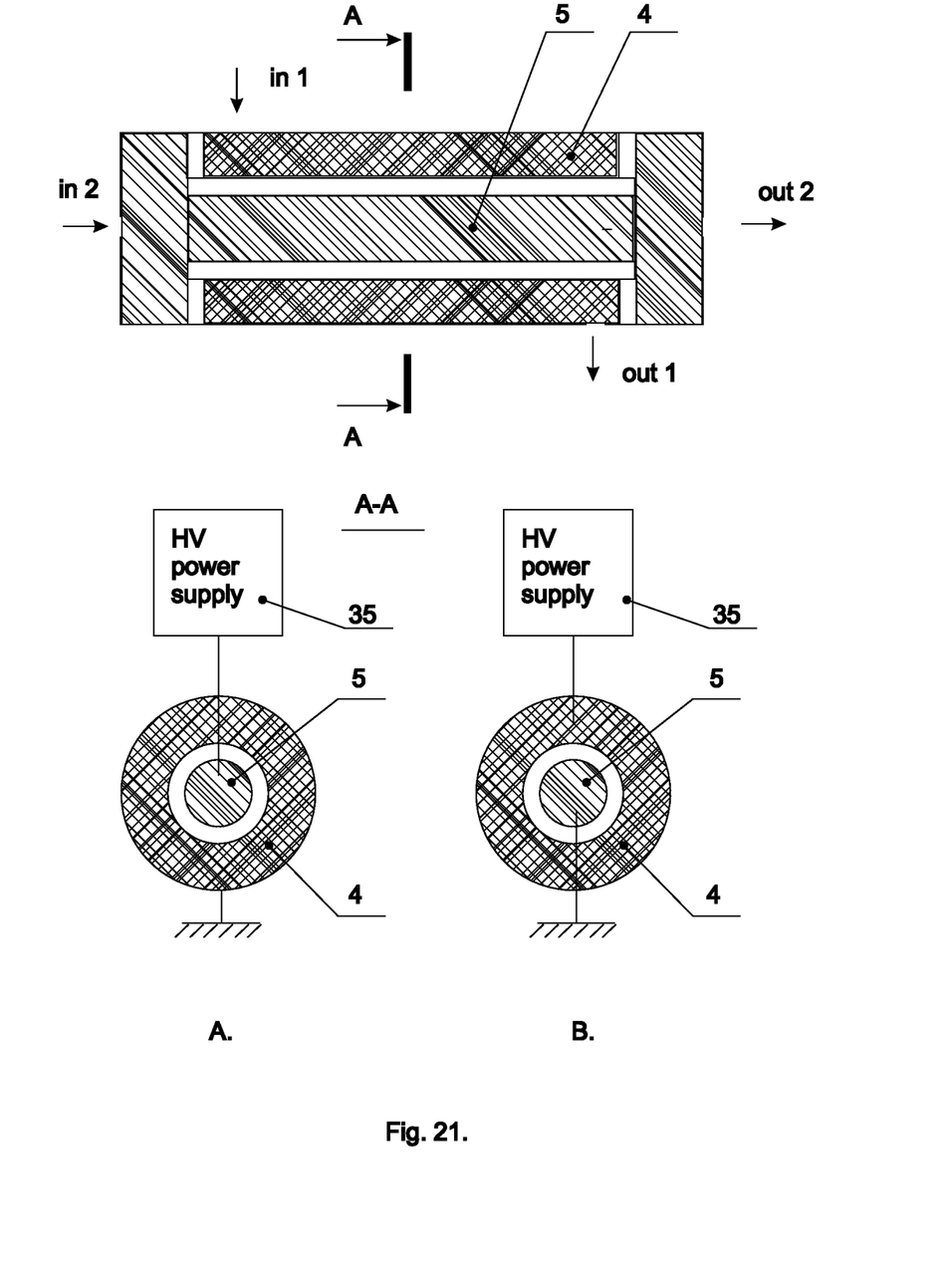
FIG. 21 shows a schematic view a diagram of electrical connections for the third embodiment of a reactor with an excimer lamp and two options A and B of a cross section of the reactor according to the present invention.

As shown in FIG. 21 (the third embodiment), it is possible to use two different streams of the liquid being treated separated by a dielectric layer. Then the liquid that has physical contact with the electrical output of power supply 35 of reactor 21 provides both electrodes. Then the radiation generated by outer 2 and inner 3 active sleeves is used to change the properties of the liquid. The use of two different streams of the liquid being treated as two electrodes is unique to this invention. Advantages: If the contaminant in the liquid being treated is not sensitive to oxidizing agents (ozone, singlet oxygen, hydroxyl radical, and others), the increase of the degree of liquid disinfection or purification is achieved only by UV irradiation of the liquid.

Figure 6:
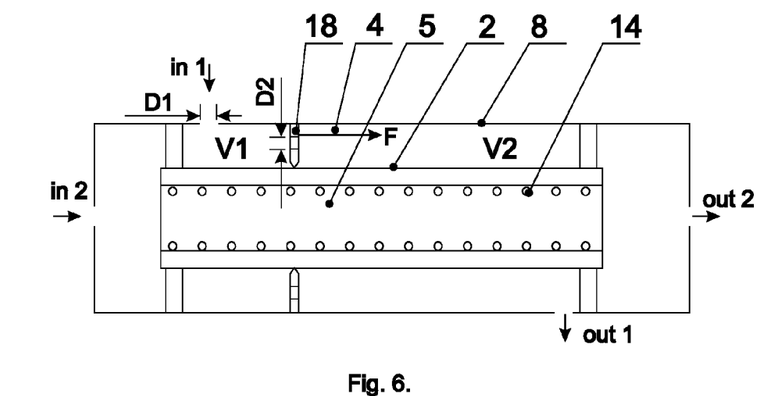
FIG. 6 shows a schematic view of the first embodiment of a reactor with a sleeve wiping system where a wiper has hole(s) and an example of an electrode that is not the liquid being treated.

The shape, material thickness, and the distance between adjacent elements (the inter-coil distance in a spiral case or the cell size in a cell structure) of an electrode 14 or 17 made of a conductor that is not the liquid being treated, can provide the simultaneous generation of a corona-discharge in the space around this electrode, that is, in the space of reactor 21 where this electrode is installed and excimer irradiation inside lamp 1. FIGS. 4, 5, and 6 provide examples of an electrode 14 or 17 made of a conductor that is not the liquid being treated. In FIG. 4 and FIG. 6, electrode 14 (an electrode with spiral shape) is installed in space 5 (inside inner sleeve 3) where corona-discharge is generated in flowing gas mixture containing oxygen. In FIG. 5, electrode 17 (an electrode with spiral shape) is installed in space 4 (around outer sleeve 2) where corona-discharge is generated in flowing gas mixture containing oxygen. The combined use of UV radiation and corona-discharge for generation of oxidizing agents (ozone, singlet oxygen, hydroxyl radical and others) in gas mixture is unique to this invention. Advantages: It increases the effectiveness and depth of liquid disinfection and purification, reduces energy consumption and liquid treatment operating cost.

Both a corona-discharge in a space of reactor 21 where is installed an electrode 14 or 17 that is not the liquid being treated, if any, and the emission of the excimer lamp 1 filled with gas are used for generation of the oxidizing agents (ozone, singlet oxygen, hydroxyl radical, and others). This is a new method of the invention.

The shape, material thickness, and the distance between adjacent elements (the inter-coil distance in a spiral case or the cell size in a cell structure) of an electrode 14 or 17 made of a conductor that is not the liquid being treated, provides the initialization and steady excimer UV emission of the maximum intensity for the given geometrical dimensions, pressure and composition of the filling mixture and the given parameters of the power supply 35 of lamp 1.

An electrode 14 or 17 made of a conductor that is not the liquid being treated may consist of one or several materials connected mechanically, chemically, thermally or otherwise. The electrode that consists of several materials connected mechanically, chemically, thermally or otherwise is unique to this invention. Advantages: simplifies the production of reactor 21 and reduces its cost, increases production of oxidizing agents (ozone, singlet oxygen, hydroxyl radical, and others) due to increased capacity of the corona-discharge, reduces power consumption.

If inner sleeve 3 of lamp 1 has sections of a different diameters or conic sections, the electrode made of a conductor that is not the liquid being treated may consist of several parts. Then, each part may perform a different function—i.e., initializing the excimer emission (ignition) and maintaining the existing excimer emission (combustion). The electrode that consists of several parts is unique to this invention. Advantages: it provides a reduction of ignition voltage, reduces power consumption, and helps environment protection.

An electrode made of a material conducting electric current that is not the liquid being treated may be incorporated into the material of inner 3 or outer 2 sleeves. It may also be manufactured by means of spray deposition, printing, or any other means of making the coating. The electrode material and the technology for its application must be robust enough to withstand a prolonged exposure to UV radiation and oxidants (ozone, singlet oxygen, hydroxyl radical and others). This item is unique to this invention. Advantages: they provide increased service life of the reactor preventing oxidative reactions at the electrode surface and preservation of optimal shape and intensity of the excimer discharge.

Reactor Assembly

The reactor assembly 21 consists of excimer lamp 1 with elements for fastening and hermetically sealing lamp 1. Excimer lamp 1 is installed in reactor housing 8 that is made of a corrosion resistance alloy. Reactor housing 8 may have dielectric coating of its outer surface or at some areas of its inner surface.

An excimer lamp 1 is located inside reactor housing 8 and is fastened by flanges 7. A sealing material is placed between flanges 7 and outer sleeve 2 of lamp 1, as well as between reactor housing 8 and flanges 7 (FIG. 1 and FIG. 2).

The criterion for selecting the material for flanges 7 is the ability to withstand the working environment with possible impurities in it, as well as the resistance to UV radiation. The material for the hermetically sealing of lamp 1 may be selected with the same criterion. It may be an adhesive, a polymer or any other material capable of functioning in the treated liquid substance under the pressure between 101.3 and 1519.5 kPa.

The intensity of the radiation emitted by any UV lamp dissipates as the distance from the emitting surface of the lamp increases. To improve the quality of treatment of the liquid flowing in space 4 by UV radiation with outer active sleeve 2 and to maximize UV irradiation of the liquid, the distance C (FIG. 1) between the outer surface of outer active sleeve 2 and the inner wall of reactor housing 8 is selected on the basis of the characteristics of the liquid being irradiated and its UV transmittance in such a way that it provides the best exposure of the liquid substance to UV radiation. In this case, the liquid flow can be periodically changed from turbulent to laminar at different segments along the length of lamp 1.

If it is impossible to achieve the required flow rate and/or quality of the treatment of the liquid flowing in space 4 between the outer surface of the external active sleeve 2 and the inner wall of reactor housing 8 (for example, because of the characteristics of the liquid being treated), the distance C is increased until the required throughput is reached. Then extra element 10 that makes the liquid flow turbulent is installed (FIG. 1 and FIG. 3).

When the liquid being treated flows in space 5, and inner active sleeve 3 is used for UV irradiation of the liquid, element 11 for creating a turbulent flow of the liquid is installed inside internal space 5 of lamp 1 on the side of input "in2" (FIG. 2). Configuration and direction of openings in element 11 are aligned in order to avoid creation of dead zones inside lamp 1.

Figure 3:
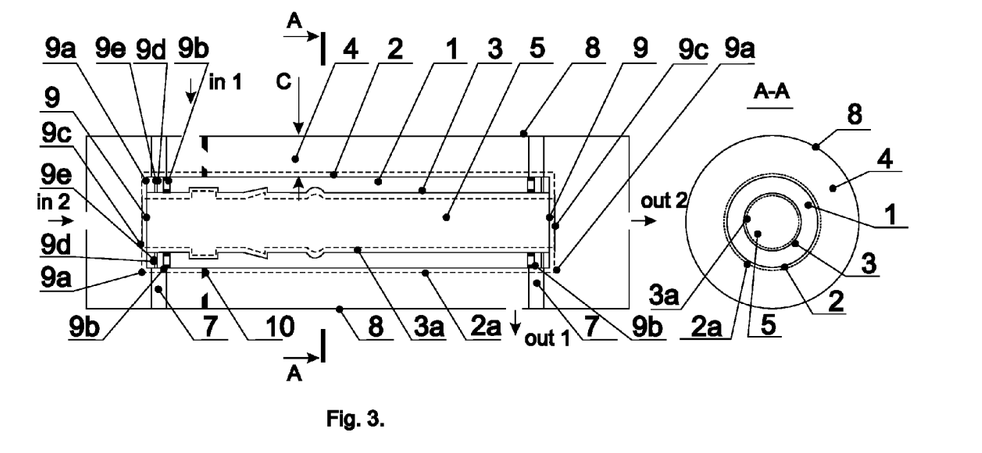
FIG. 3 shows a schematic view of the first embodiment of a reactor with an excimer lamp and a cross section of the reactor according to the present invention with an example of inner sleeve 3, which has parts with a different diameter or conic sections located anywhere within the sleeve and having any length.

As shown in FIG. 1 and FIG. 3, in the first embodiment, the liquid to be treated may get inside space 5 of lamp 1 through inlet "in2", and after radiation, exit reactor 21 through outlet "out2". The gas mixture (ambient air or oxygen) for generation of oxidizing agents (ozone, singlet oxygen, hydroxyl radical, and others) enters through inlet "in1". The oxidizing agents-containing mixture exits housing of reactor 8 through outlet "out1".

As shown in FIG. 2, in the second embodiment, the liquid to be treated may get inside housing of reactor 8 through inlet "in1", and after radiation, exit through outlet "out1". The gas mixture (ambient air or oxygen) for generation of oxidizing agents (ozone, singlet oxygen, hydroxyl radical, and others) generation enters housing of reactor 8 through inlet "in2". After UV exposure, the oxidizing agents-containing mixture exits the apparatus through outlet "out2".

System for Cleaning the Emitting Active Surfaces of the Lamp

The lamp cleaning system comprises a set of activities aimed at removing contaminants from the emitting surface of the lamp (a sleeve adjoining the liquid being emitted. The implementation of the cleaning system may employ chemical, abrasive, or mechanical approaches.

Under the chemical approach repeated with a certain periodicity, a chemical (or a mixture of chemicals) dissolvable in the liquid and capable of removing contaminants from the emitting sleeves is added to the liquid adjoining the emitting sleeve. In this case, the liquid is declared "technical liquid" and it is supplied through different pipes. The cleaning cycle is followed by a rinsing cycle (removing the residue of the non-potable cleaning liquid from the surface of the emitting sleeve). Then, the working cycle is resumed. The excimer lamp is not turned off during the periodic cleaning, as it is a continuously operating apparatus. The technical cleaning liquid may be recycled and reused after removing the contaminants from it.

Under the abrasive approach repeated with a certain periodicity, an abrasive mixture consisting of insoluble particles forming a colloid (emulsion) and removing contaminants from the emitting sleeve is added to the liquid adjoining the emitting sleeve of reactor 1. Then the liquid is declared "technical", and it is supplied through different pipes. The abrasive cleaning cycle is followed by a rinsing cycle (removing the residue of the technical cleaning liquid from the surface of the emitting sleeve of lamp 1. Then, the working cycle is resumed.

Positive and negative surges of pressure of the liquid being treated as well as the use of ultrasound improve the efficiency of cleaning, as the particles suspended in the liquid oscillate around the surface of an active sleeve of lamp 1.

The waste technical cleaning liquid (the liquid with insoluble particles or emulsion) may be recycled and reused after removing the contaminants from it.

Under the mechanical approach, removing contaminants from the lamp 1 emitting sleeve adjoining the liquid being treated is performed by a mechanical movement of a wiper touching the sleeve of lamp 1 and removing contaminants. The sleeve wiping takes place while the reactor with excimer lamp 1 is online and operating; there is no need to shut down or bypass the reactor.

Examples of Implementation of the Mechanical Wiping System

Example of the Mechanical Wiping System Implementation 1 (FIG. 4)

The liquid to be treated enters the reactor housing 8 through input "in1" and, after being subjected to radiation, exits through output "out1". A screw pair system 13 resides in space 4 limited by the external wall of reactor housing 8 and the outer active reactor's sleeve 2. A driver of the screw pair system 13 (not shown in FIG. 4), resides outside space 4. The wiper 12 moves forward parallel to the axis of sleeve 2 by using rotated screw pair system 13. As wiper 1 is in contact with surface of outer sleeve 2 surface, it mechanically removes contaminants from the sleeve. The necessity of a cleaning is determined either by the performance deterioration of the reactor, or by the predetermined service schedule.

Example of the Mechanical Wiping System Implementation 2 (FIG. 5)

The liquid to be treated enters the reactor housing 8 through input "in2" and, after being subjected to radiation, exits through output "out2". A screw pair system 16 resides in space 5 limited by inner active sleeve 3. The driver of the screw pair system (not shown in FIG. 5) resides outside space 5. Wiper 1 moves forward parallel to the axis of sleeve 3 by using of rotated screw pair system 16. As wiper 1 is in contact with lamp's sleeve 3 surface, it mechanically removes contaminants from the sleeve. The necessity of a cleaning is determined either by the performance deterioration of the reactor, or by the predetermined service schedule.

Example of the Mechanical Wiping System Implementation 3 (FIG. 6)

The liquid to be treated enters housing of reactor 8 through input "in1" and, after being subjected to radiation, exits through output "out1". Wiper 18 is in mechanical contact with inner surface of reactor housing 8 and outer sleeve 2 of reactor 1. The surface of wiper 18 has holes of diameter $D2*i$ and $D2*<D1$. ($*D2$ is the sum of the diameters of all openings in wiper 18). $D1$ is the diameter of inlet "in1". As the liquid enters housing of reactor 8 through the inlet "in1", the pressure in area V1 becomes greater than the pressure in area V2, because of the difference of the diameters $D2$ and $D1$. The difference of the two pressures creates force F that moves wiper 18 toward exit "out1". To make wiper 18 to move back, the input "in1" and the output "out1" are switched and the liquid to be treated flow is reversed. Hence, wiper 18 moves in the opposite direction. As wiper 18 is in contact with lamp outer sleeve 2 surface, it mechanically removes contaminants from the sleeve. Force F is great enough to overcome friction on the sleeve 2 surface. Pressure drop across the cleaning wiper 18 must be great enough to overcome the friction. The necessity of a cleaning of emitting sleeve 2 is determined either by the performance deterioration of the reactor, or by the predetermined service schedule.

The Schemes of the Media Flow

The flow schematic of the irradiated media depicts the passage of the gas and liquid to be treated as well as that of auxiliary media through excimer lamp 1, mixing and apportioning them for achieving the best result of the disinfection and/or treatment of the contaminated liquid.

The excimer UV lamp performs two physical actions affecting the liquid (disinfection and oxidation of contaminants) and changing its properties (changing redox potential of the liquid), namely, by contaminants photolysis under exposure of the contaminated liquid to the radiation (in the UV range) and by injection strong oxidizing agents (ozone, singlet oxygen, hydroxyl radical, and other) generated in a gas mixture into the liquid being treated before or after its UV irradiation in reactor 21.

The examples of schemes of the media flow in FIG. 7 through FIG. 13 and FIG. 15 through FIG. 18 are done for the second embodiment, where air enters reactor 21 through inlet "in1" and the liquid to be treated enters reactor 21 through inlet "in2".

Figure 7:
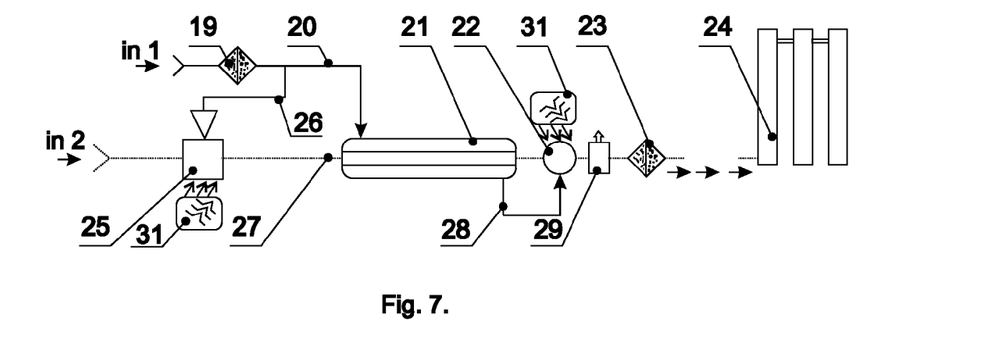
FIG. 7 through FIG. 12 show different schemes of an implementation of treatment of the liquid and media flow in a treatment system with one reactor.

In FIG. 7 (Scheme 1), the air flows through gas line 20, passes air filter 19 and enters into inlet "in1" of reactor 21. This air flow is used in a pure form for production of a gas mixture or contains certain additives that increase the production of oxidizing agents after the UV radiation and corona-discharge. The air is partly is added into dosing injector 25 through gas line 26 for the saturation of the liquid to be treated with air containing additives. After a simultaneous treatment by UV radiation and corona-discharge of the air in space around outer sleeve 2 of lamp 1, the gas mixture 28 containing generated oxidizing agents flows into chamber 22. The mixing of the liquid treated with UV emitted by lamp 1, and a gas mixture containing oxidizing agents takes place in chamber 22. Then the liquid passes degasifier 29 and flows to filter 23, and then enters the next stage of treatment 24, if any. The cavitation generated by ultrasonic generator 31 may be used in dosing injector 25 and in chamber 22 for a better dissolution of the gas. This action will also generate an oxidant. The switches, power supplies, driving force, flow, valves, flow meters, etc. are not shown in the Scheme 1, FIG. 7.

Scheme 2 (FIG. 8) differs from Scheme 1 (FIG. 7) in that a gas mixture, which is fed into injector 25, has an elevated level of oxygen (produced by an oxygen generator or supplied from oxygen container 30) in order to increase the saturation of the liquid to be treated with oxygen and raise its UV exposure. The switches, power supplies, driving force, flow, valves, flow meters, etc. are not shown in the Scheme 2, FIG. 8.

Figure 8:
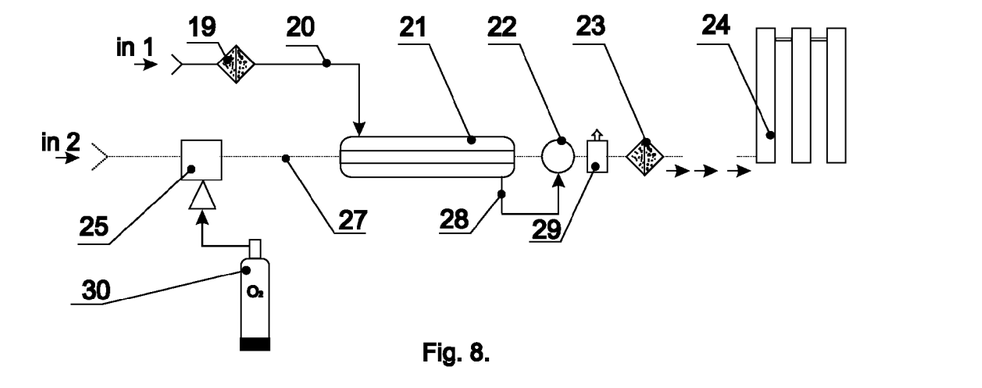
Figure 9:
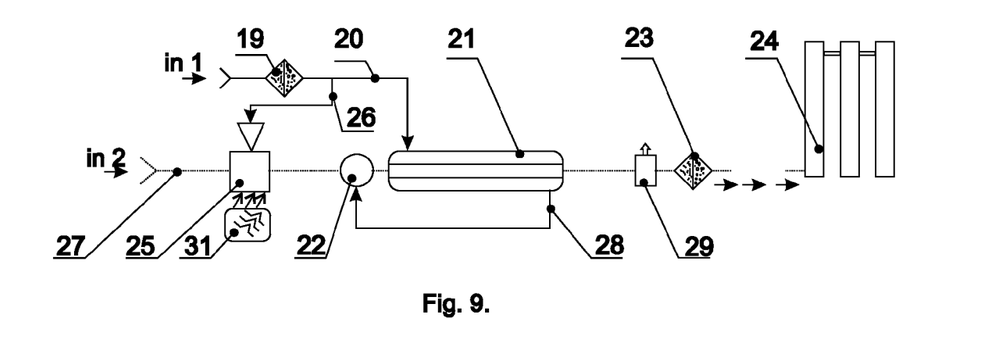
Figure 10:
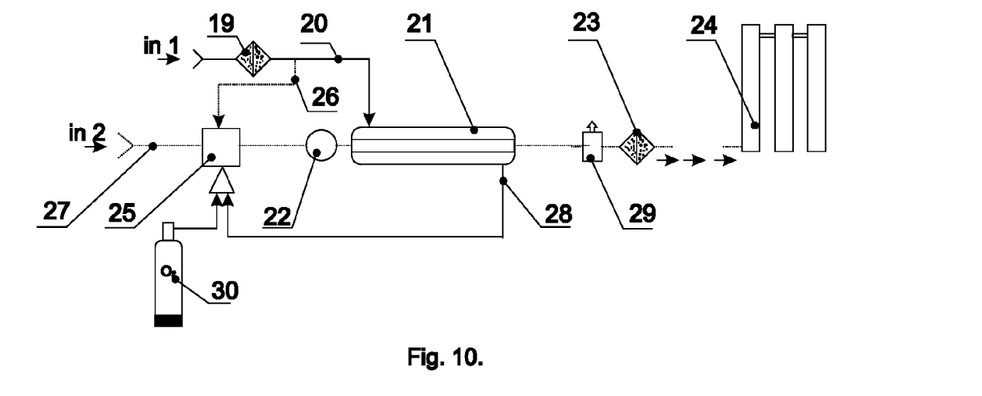

Scheme 3 (FIG. 9) differs from the previous ones in that a gas mix 28 containing oxidizing agents from reactor 21 is injected into the liquid to be treated prior its expose to a UV radiation, since mixing chamber 22 is located before reactor 21 with excimer lamp 1. In this case, a gas mixture 26 may flow to injector 25 as it does in Scheme 1 (FIG. 7) or used a source of oxygen as it does in Scheme 2 (FIG. 8). The switches, power supplies, driving force, flow, valves, flow meters, etc. are not shown in the Scheme 3, FIG. 9.

Scheme 4 (FIG. 10) differs in that, in order to improve the solubility and the quality of the subsequent UV radiation treatment of the liquid to be treated, a gas mix containing oxidizing agents 28 is supplied from reactor 21 to injector 25, where it is mixed with an oxygen-containing liquid-gas mixture. Here, the gas for creation of oxygen-containing liquid-gas mixture is fed to the input of injector 25 as it does in Scheme 1 (from gas line 26) or Scheme 2 (from source of oxygen 30). The additional mixing chamber 22 may or may not be present, based on the properties of the liquid being treated. The switches, power supplies, driving force, flow, valves, flow meters, etc. are not shown in the Scheme 4, FIG. 10.

Reduction of Energy Consumption

For purposes of this invention, the energy consumption is total consumption of electrical power required for the operation of reactor 21 with excimer lamp 1, while maintaining a constant level of exposure on the liquid being treated to UV disinfection and oxidation by gas mixture. The goal of reduction of energy consumption is a reduction of the load on the electricity network, resulting in lower operating costs and increased environmental protection.

Reduction of energy consumption is achieved in two ways.

1. The utilization of a control system for adjusting of the power demand of the lamp Gas analyzer 37 (FIG. 11) that measures the concentration of the oxidizing agents is installed in a feed line of the gas mixture 28 containing oxidizing agents in front of injector 25. The amount of oxidizing agents in the flow of gaseous medium is a function of the reactor 21 with excimer lamp 1 work in production of oxidizing agents and UV irradiation of the liquid being treated. The structure of the material of active sleeves 2 and 3 is changing with prolonged use of excimer lamp 1; it brings into existence "color centers" and other negative trends. As a result, the efficiency of excimer lamp 1, and, consequently, the entire treatment system can be reduced. Gas analyzer 37 monitors that reduction and increases the power supply to reactor 21 from power source 35 with the control feedback loop 36, which looks at loss of oxidants and increases power to generate more oxidants. (The maximum electrical current of high frequency power source 35 is less than 1 ampere).

The known treatment systems with an excimer lamp do not have such a control feedback loop system with a gas analyzer. Hence, they need to supply the maximum power to the lamp, which results in a premature wear of the lamp, a redundant capacity of power source, and the increased power consumption of the entire treatment system.

Figure 11:
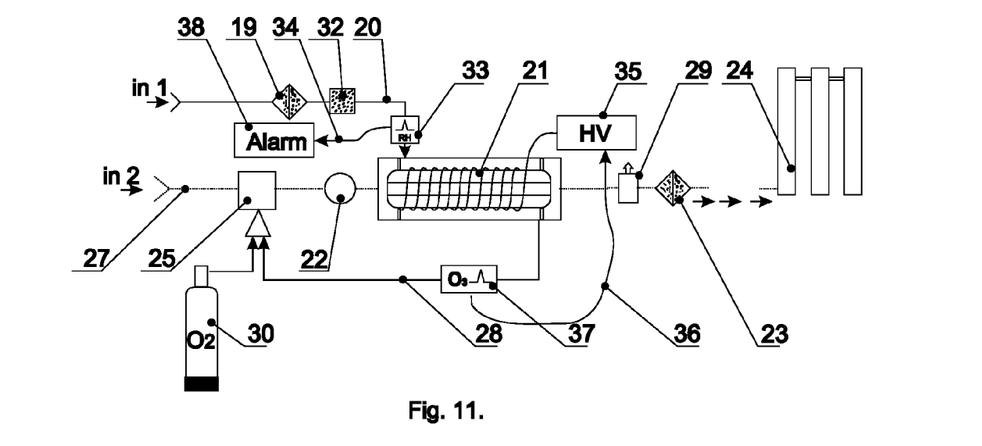

2. The utilization of air dryer 32 and air humidity meter 33 (FIG. 11)

Ambient air contains moisture, which reacts with oxidizing agents (ozone, singlet oxygen, hydroxyl radical, and others). This leads to a reduction of the oxidizing agents yield per kWh. If the humidity of the gas mixture 20 supplied to reactor 21 with excimer lamp 1 increase, the amount of oxidants produced is greatly reduced due to UV absorption by water vapor contained in gas mixture 20.

To avoid a reduction of the oxidants production, and hence, the deteriorating performance of reactor 21, the oxygen containing gas mixture 20 is dehumidified (the water vapor is removed from the gas mixture). The degree of the influent gas humidity is controlled by installed in oxygen containing feed line 20 air humidity meter (sensor of water vapor content in the gas) 33, which can either generate a signal to replace the desiccant cartridge in air drier 32 (for continuous drainage in the areas with high humidity) using alarm unit 38 via connection 34, or directly control the efficiency of the humidification process and turning air dryer 32 on and off in the areas with large fluctuations in moisture content (such as seasonal variations). Such measures provide reduction of energy consumption and operating costs for the replacement of consumable parts (desiccant cartridges) of air dryer 32. The control system operated on a feedback loop connecting vapor analyzer 33 with air dryer 32 is not shown in FIG. 11.

Optimization of Oxidant Production

In order to optimize the generation of oxidants and prevent their decomposition at electrode 17 surface (See FIG. 5, the second embodiment), which is not a liquid being treated, there should be no increase above the critical temperature on the surface of the material of the sleeves of lamp 1 and inside reactor 21. To cool the surface of active sleeve 2, on which electrode 17, which is not a liquid, is located, there is used an oxygen-containing mixture 20 supplied through "in1". The flow rate of the oxygen-containing mixture 20 is controlled based on the readings of temperature sensor 39 (FIG. 12) mounted on the active surface of sleeve 2.

Figure 12:
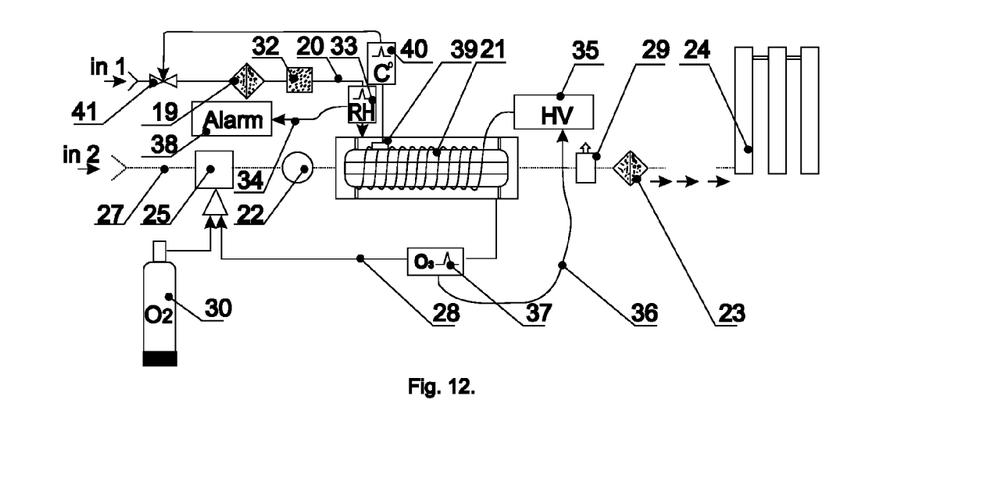

Sensor 9 readings are received and processed by analytical unit 37, which, when the temperature exceeds a critical value, increases the amount of gas entering the gas line 18. In this case, analytical unit 37 also discharges excess heat from the space inside the reactor 19 and from the surface of the sleeve 2 and the working electrode 12, through a valve 35.

Layout of the Excimer Lamps

Figure 13:
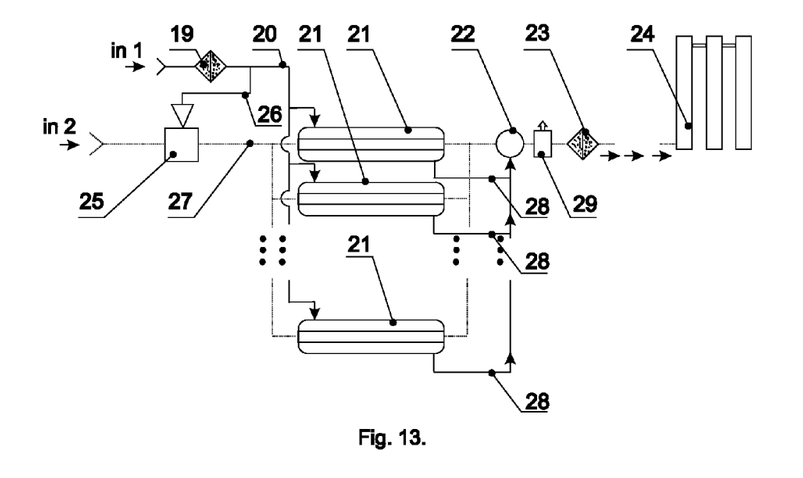
FIG. 13 shows a layout of a system for treatment of the liquid with several reactors installed in parallel.

To increase the output of the treatment system, several reactors 21 with excimer lamp 1 can be installed in parallel (FIG. 13).

Figure 14:
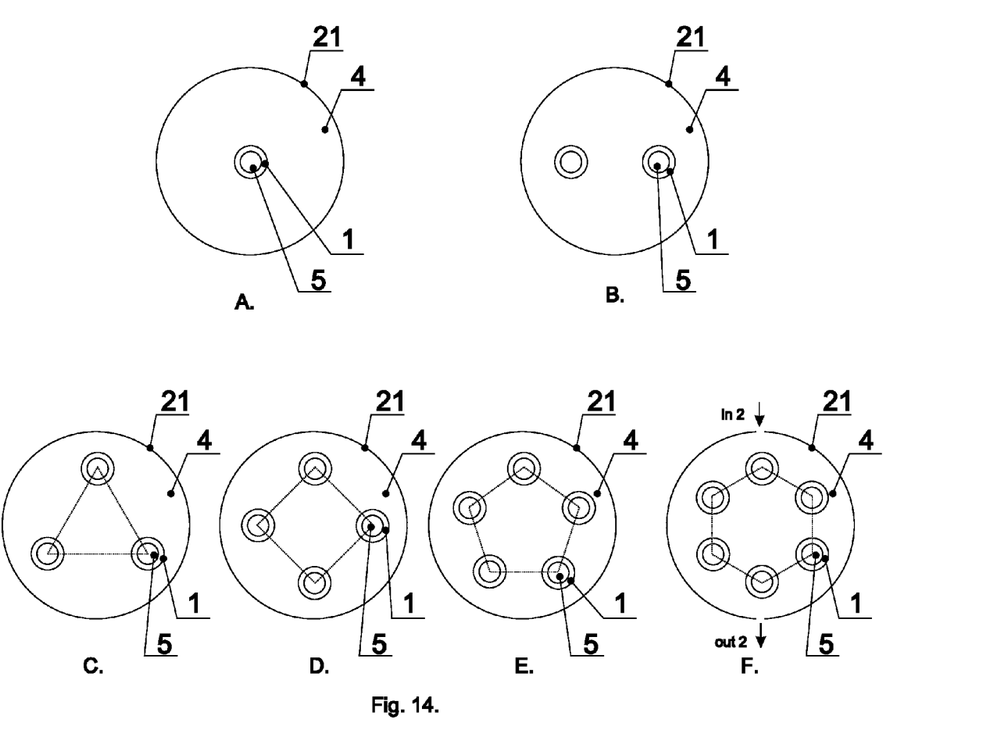
FIG. 14 shows the first embodiment of a reactor with one (A), two (B), three (C), four (D), five (E), and six (F) excimer lamps installed in a single reactor housing.

Another option of increasing the output of the treatment system is an installation of several units of excimer lamp 1 in a single reactor housing 21 (FIG. 14). Then, the axial lines of three or more lamps 1 in a single reactor coincide with the geometric centers of the polygons. This type of the lamps 1 installation is used when the liquid being treated flows through space 4 (the first embodiment). The flow of liquid to be treated into reactor 21 through inlet "in2" can be perpendicular to lamps 1 (FIG. 14, Cross Section F) or parallel to lamps 1.

Figure 15:
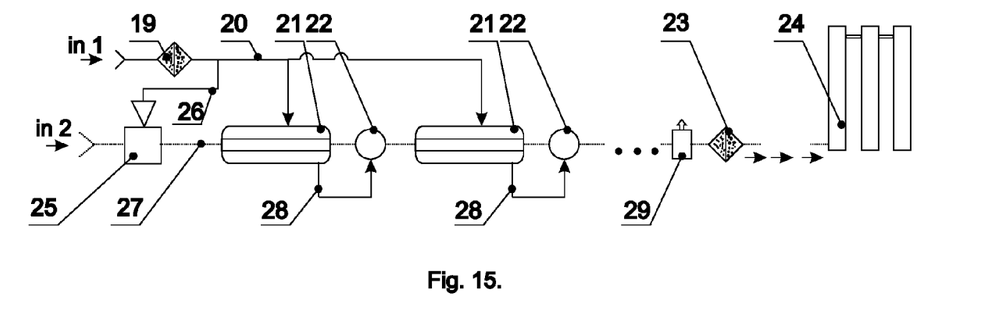
FIG. 15 shows a layout of a system for treatment of the liquid and media flow with several reactors installed in serious.
Figure 16:
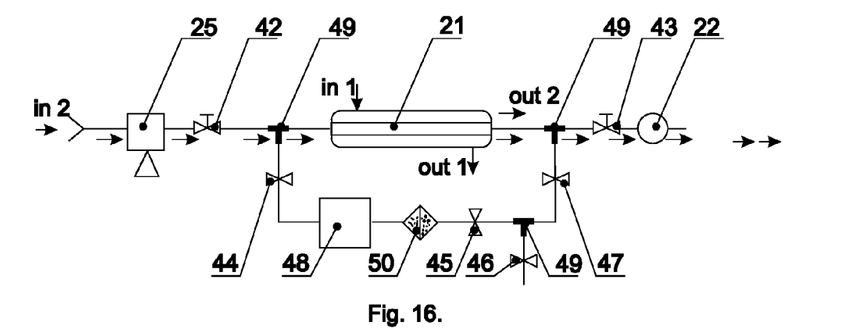
FIG. 16 through FIG. 18 show schemes of three modes of liquid flow during the operations of the reactor—normal mode, cleaning up the lamp, and flushing mode.

To increase the depth of disinfection and/or purification of the liquid to be treated, several reactors 21 can be installed in series (FIG. 15).

The schemes of liquid flow based on the second embodiment (inlet "in1" is a gas line; inlet "in2' is a liquid line).

There are three modes of liquid flow during the operations of the rector—normal mode, cleaning up the lamp, and flushing mode.

In normal mode (FIG. 16) the liquid being treated passes through the lamp 1. In this mode, valves 42 and 43 are open; valves 44, 45, 46, and 47 are closed.

Under the mode of cleaning up the lamp (FIG. 17), the cleaning liquid is pumped from tank 48 under pressure through tee fitting 49 into the lamp 1 for cleaning the working sleeve. In this mode, valves 42, 43, and 46 are closed; valves 44, 45, and 47 are open.

Figure 17:
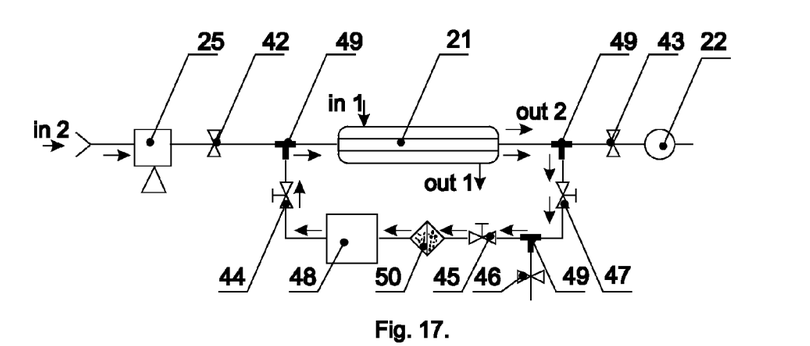
Figure 18:
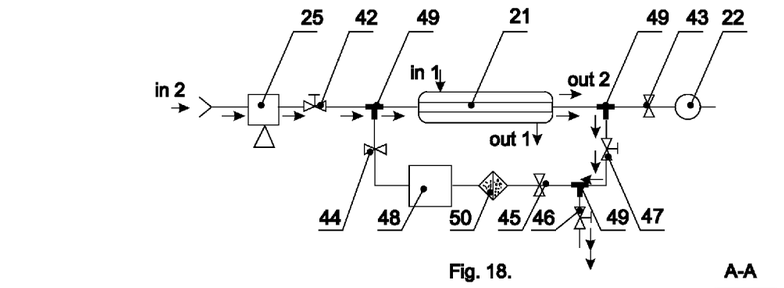

Here the liquid moves through a closed loop, in which filter 50 for cleaning and regeneration of this liquid is provided.

In the flushing mode (FIG. 18), the cleaning liquid left in is removed from the system. In this mode, valves 42, 47, and 46 are open; valves 44, 45 and 43 are closed.

Lamp 1 returns to the normal mode of operations after completion of the flushing mode.

Diagrams of Electrical Connections

Figure 19:
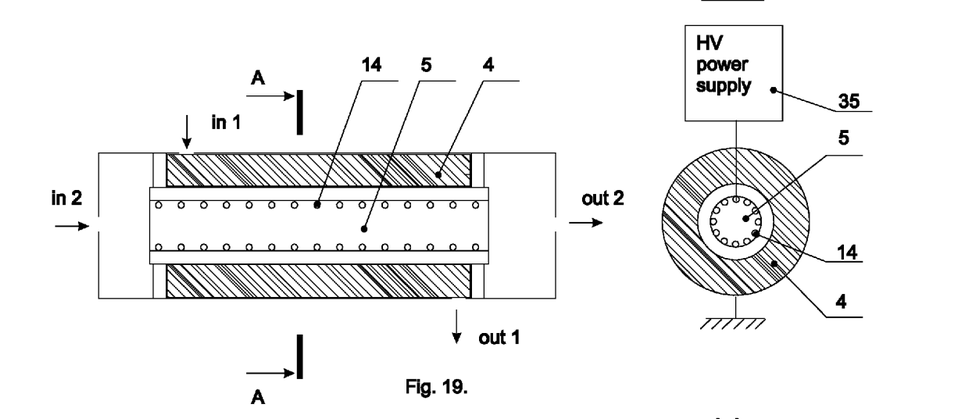
FIG. 19 shows a schematic view of a diagram of electrical connections for the first embodiment of a reactor with an excimer lamp and a cross section of the reactor according to the present invention.

If the electrode, which is not a liquid, is adjacent to the surface of the inner sleeve 3 of excimer lamp 1, then this electrode 14 is powered by a high-voltage source 35. Then, the liquid located in space 4 acts as the ground electrode (FIG. 19).

Figure 20:
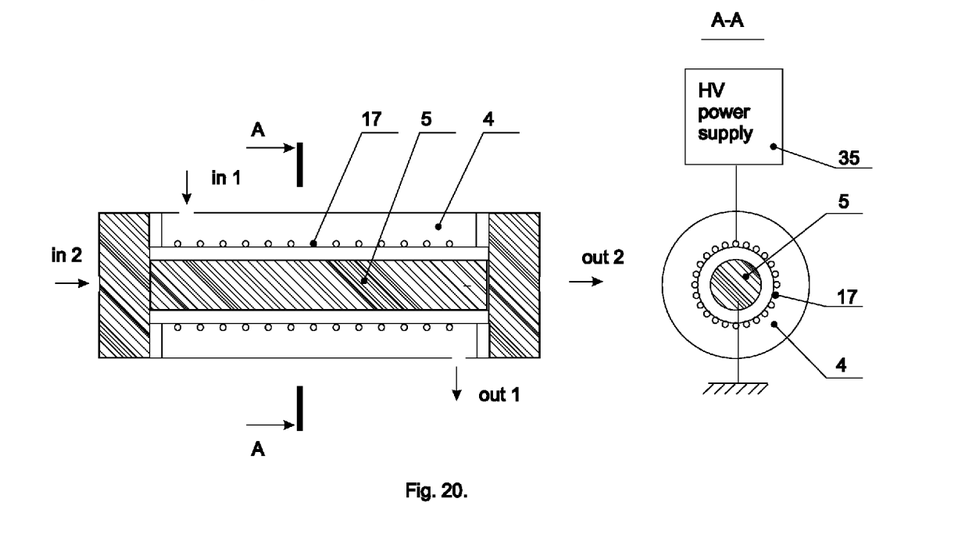
FIG. 20 shows a schematic view of a diagram of electrical connections for the second embodiment of a reactor with an excimer lamp and a cross section of the reactor according to the present invention.

If the electrode, which is not a liquid, is adjacent to the surface of the outer sleeve 2 of excimer lamp 1, then this electrode 17 is powered by a high-voltage source 35. Then, the liquid located in space 5 acts as the ground electrode (FIG. 20).

If both electrodes are liquids, then, provided that the necessary electrical junctions are available, the function of the high-voltage electrode can play any of two liquid flows, as one in contact with the outer sleeve 2 (the liquid in space 4) (FIG. 21, Cross Section A) or the second one, which is in contact with the inner sleeve 3 (the liquid in space 5) (FIG. 21, Cross Section B) because the liquid is in contact with both outer sleeve 2 and inner sleeve 3.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A system for treatment of a liquid, comprising: two coaxial sleeves, an inner sleeve and an outer sleeve, wherein the inner sleeve is located inside the outer sleeve; a first space between the inner and outer sleeve is filled with an excimer gas, forming a lamp, which irradiates an excimer UV radiation when a voltage is applied to two electrodes;
   both sleeves made of rigid material transparent to the excimer UV radiation;
   both sleeves are placed inside a reactor housing, the housing is coaxial with the sleeves;
   the housing containing an inlet and outlet for the flowing liquid subjected to the treatment and a gas inlet and a gas outlet for a flowing gas mixture;
   the liquid being treated is flowing inside the inner sleeve and is subject to treatment by the excimer UV radiation; and
   a second space between the outer sleeve and the housing contains the flowing gas mixture, which is also a subject to treatment by the excimer UV radiation at the same time as the liquid treatment; the flowing gas mixture enters the second space between the outer sleeve and the reactor housing via the gas inlet and exits via the gas outlet; oxidizing agents in the flowing gas mixture are produced under UV radiation action; the flowing gas mixture with the oxidizing agents to be used for an oxidation of contaminants in the liquid;
   the flowing gas mixture with the oxidizing agents passes through the liquid in a mixing chamber located downstream said excimer UV radiation treatment;
   wherein a double function of the same excimer gas UV radiation is achieved simultaneously in the same system the liquid UV treatment and a generation of the oxidizing agents in the flowing gas.

2. The system of claim 1, wherein the sleeves are made of a material transparent to ultraviolet and vacuum ultraviolet (UV) light, wherein the material is a synthetic quartz to which a stabilizer an additive has been added that widens an allowable UV spectral bandwidth of UV light transmission through the sleeve material.

3. The system of claim 1, wherein the generation of the oxidizing agents in the flowing gas mixture is carried out under combined action of corona-discharge and excimer emission, using the same high voltage energy supply.

4. The system of claim 1, wherein the oxidizing agents are ozone, singlet oxygen, and hydroxyl radical.

5. The system of claim 1, wherein the excimer gas includes chemicals to change the UV emission spectrum.

6. The system of claim 1, wherein outer and inner sleeves have coatings that change the electrical conductivity on the surface of the sleeves.

7. The system of claim 1, wherein before filling the first space between the coaxial sleeves with the excimer gas, a desorption of residual gases existing in the material of the sleeves is performed by means of filling the first space with a special temporary liquid or/and gas desorption mixture via an inlet into the first space between the coaxial sleeves, thus causing a short-term increased desorption of impurities from internal surfaces of the sleeves during irradiation of the desorption mixture by a radiation in a wavelength range that the desorption mixture is sensitive to.

8. The system of claim 1, wherein includes: elements of active gas absorption of the dissolved under-absorbed gases and other pollutants and gases generated inside the lamp when the lamp is connected to a vacuum system or a device for filling it with active, auxiliary or temporary gases; wherein the elements of active gas absorption are chemical compounds based on barium, titanium, or zirconium.

9. The system of claim 1, wherein the inner sleeve has parts with different diameters or conic sections located anywhere within the inner sleeve and have any length to facilitate initializing a discharge at the start of the system operation.

10. The system of claim 1, wherein both ends of the lamp are made of a material different from the material of the inner and outer sleeves, but with the same coefficient of linear thermal expansion (CLTE) as that of the material of the inner and outer sleeves.

11. The system of claim 1, wherein both ends of the lamp have coefficient of linear thermal expansion (CLTE) that is different from the CLTE of the rigid inner and outer sleeves material transparent to the excimer UV radiation.

12. The system of claim 11, further comprising transition rings are inserted into the surface of the contact of the sleeves of the lamp and the ends of the lamp to achieve a gradual transition between two materials with different coefficient of linear thermal expansion (CLTE).

13. The system of claim 11, wherein edges, where inner and outer sleeves contact the ends, have joints with a transitional coefficient of linear thermal expansion (CLTE).

14. The system of claim 1, wherein solder areas, which connect the first space between the inner and outer sleeves to a vacuum machine or a gas supply source for technological testing of the lamp and filling it with the excimer gas, are located on the ends or on one of the sleeves of the lamp and have a coefficient of linear thermal expansion (CLTE), which is the same or different from that of a CLTE of the sleeves.

15. The system of claim 1, wherein solder areas which connect the first space between the inner and outer sleeves to a vacuum machine or a gas supply source for technological testing of the lamp and filling it with the excimer gas, consist of several parts located sequentially and made of identical or different materials joined to each other hermetically.

16. The system of claim 1, wherein both ends of the lamp have a coating that reduces electrical conductivity compared to the main material the ends are made of.

17. The system of claim 1, wherein the liquid being treated acts as at least one of the electrodes.

18. The system of claim 1, wherein both electrodes are liquid, where two separate streams of the same liquid being treated serve as the electrodes.

19. The system of claim 1, wherein at least one additive is added to a liquid being treated to provide a higher transparency of the liquid.

20. The system of claim 1, wherein an electrode made of a conductor that is not the liquid being treated, consists of several materials connected mechanically, chemically, or thermally.

21. The system of claim 20, wherein an electrode made of a conductor that is not the liquid being treated, is incorporated into the material of the inner or outer sleeves by means of spray deposition, printing, or other means.

22. The system of claim 1, including an element installed inside the inner sleeve; wherein the element makes turbulent the flow of the liquid being treated by means of a set of openings controlling the direction of the flow for the purpose of avoiding a creation of dead zones inside the inner sleeve.

23. An assembly comprising the system of claim 1, further comprising one or more additional systems of claim 1, wherein the systems are installed sequentially to increase the degree of the liquid treatment.

24. A system for treatment of a liquid, comprising:
 two coaxial sleeves, an inner sleeve and an outer sleeve, wherein the inner sleeve is located inside the outer sleeve; a first space between the inner and outer sleeve is filled with an excimer gas, forming a lamp, which irradiates an excimer UV radiation when a voltage is applied to two electrodes;
 both sleeves made of rigid material transparent to the excimer UV radiation;
 both sleeves are placed inside a reactor housing, the housing is coaxial with the sleeves;
 the housing containing an inlet and outlet for the flowing liquid subjected to the treatment and a gas inlet and a gas outlet for a flowing gas mixture;
 the liquid being treated is flowing inside a second space between the outer sleeve and the housing and is subject to treatment by the excimer UV radiation; the liquid enters the space via the inlet for liquid and exits via the outlet for liquid; and
 the flowing gas mixture is flowing inside the inner sleeve, which is also a subject to treatment by the excimer UV radiation at the same time as the liquid treatment; the flowing gas mixture enters the inner sleeve via the gas inlet and exits via the gas outlet; oxidizing agents in the flowing gas mixture are produced under UV radiation action; the flowing gas mixture with the oxidizing agents to be used for an oxidation of contaminants in the liquid;
 the flowing gas mixture with the oxidizing agents passes through the liquid in a mixing chamber located downstream said excimer UV radiation treatment;
 wherein a double function of the same excimer gas UV radiation is achieved simultaneously in the same system: the liquid UV treatment and a generation of the oxidizing agents.

* * * * *